Aug. 25, 1931.   R. B. CREHORE   1,820,880
METHOD OF AND APPARATUS FOR MARKING OBJECTS
Filed Dec. 3, 1927   2 Sheets-Sheet 1
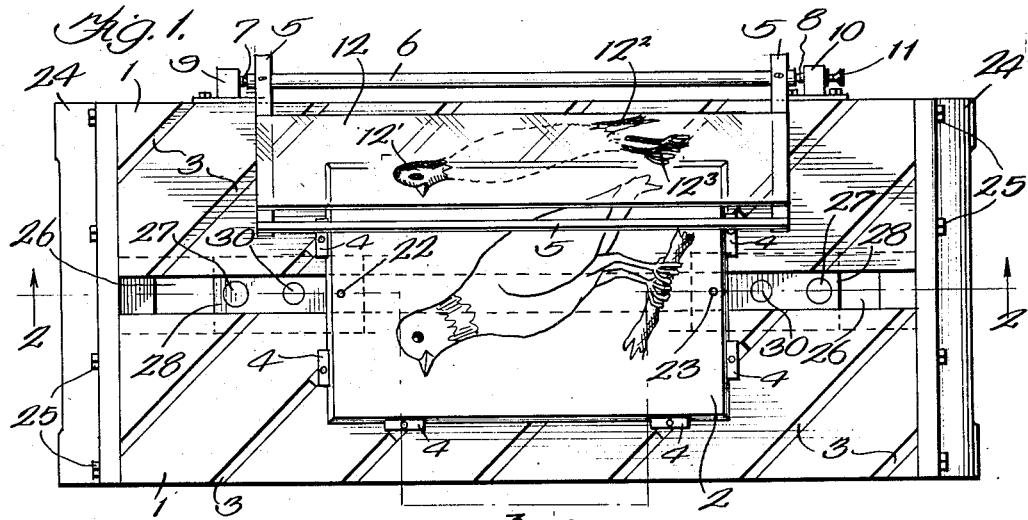
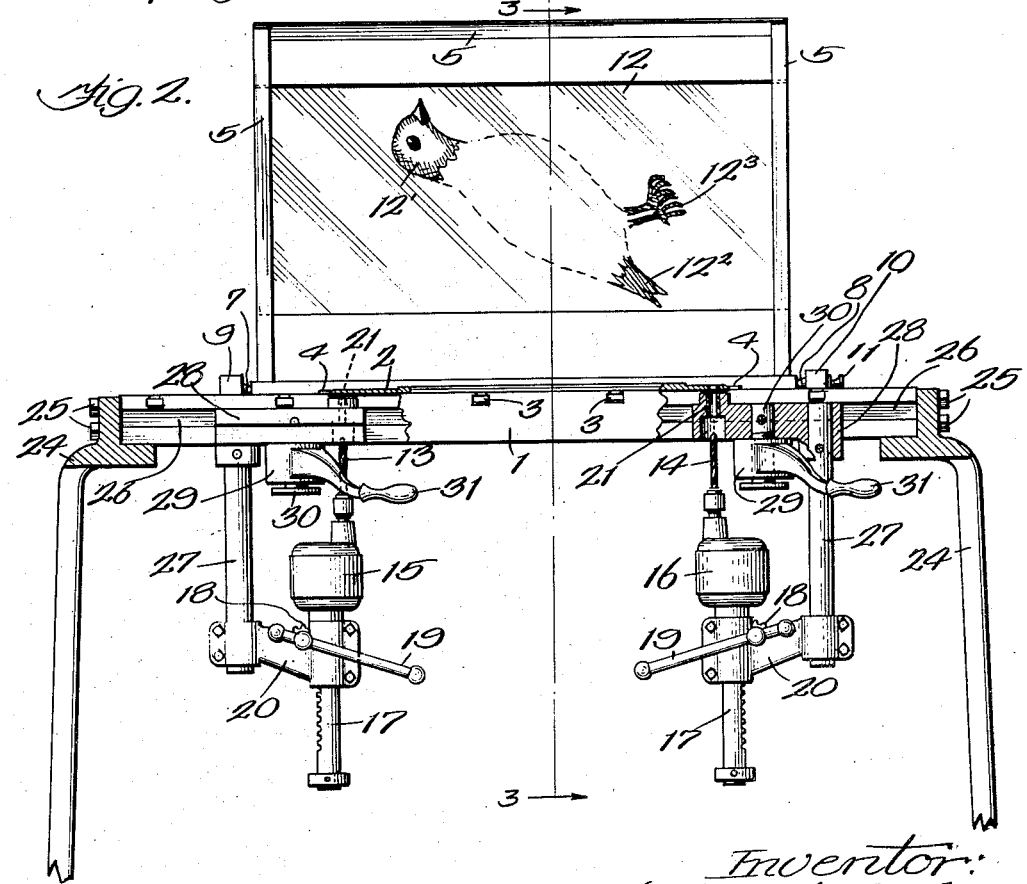
Inventor:
Robbins B. Crehore Aug. 25, 1931. R. B. CREHORE 1,820,880
METHOD OF AND APPARATUS FOR MARKING OBJECTS
Filed Dec. 3, 1927  2 Sheets-Sheet 2
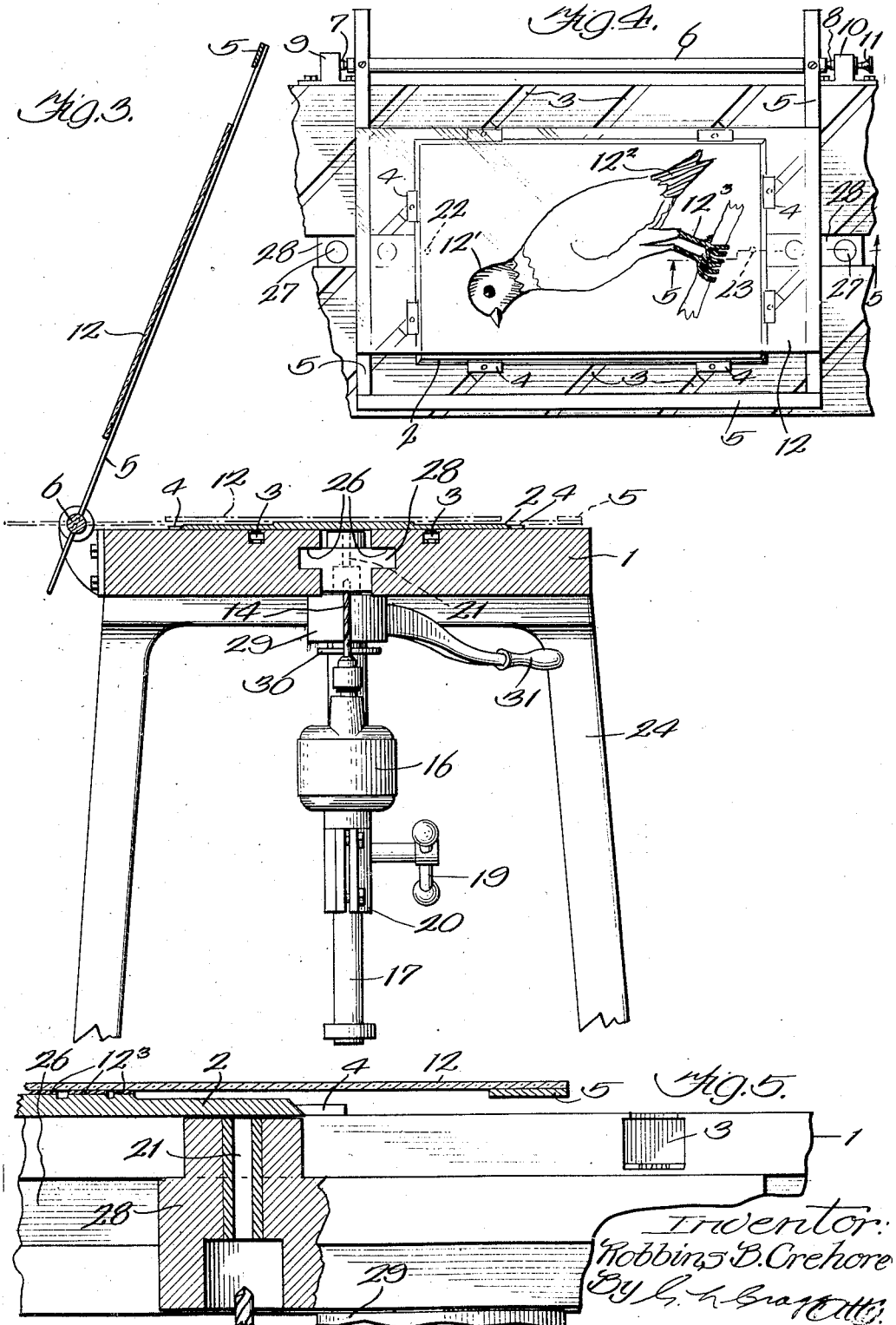
Inventor:
Robbins B. Crehore Patented Aug. 25, 1931

1,820,880

UNITED STATES PATENT OFFICE

ROBBINS B. CREHORE, OF CHICAGO, ILLINOIS, ASSIGNOR TO HACKER MANUFACTURING CO., OF CHICAGO, ILLINOIS, A CORPORATION OF ILLINOIS

METHOD OF AND APPARATUS FOR MARKING OBJECTS

Application filed December 3, 1927. Serial No. 237,491.

My invention relates to an apparatus for marking objects and is very usefully employed in providing a series of color printing plates with equally spaced marks in order that the plates may be successively imposed in exactly the same place upon a printing bed or form whereby the printing, in different colors, effected from said plates upon the same print will be in exact register.

My invention is an improvement upon the structure of Patent 1,620,343, dated March 8, 1927. The marking implement of that patent includes a bed for supporting the objects to be marked, a gauge spaced above the bed to permit positioning of objects to be marked beneath the gauge and over the bed and having indices located at a distance from each other to register with correspondingly spaced apart indices upon the object to be marked, and a single marking element having a guide, both the marking element and its guide being in fixed relation to the gauge. In the prior apparatus it is necessary not only to accurately locate the plate that is to be marked for the first marking operation but to also accurately position the same plate for a second marking operation to produce two spaced apart marks thereon. By means of my present invention, the plate needs only to be accurately adjusted once for both marking operations, a result which is enabled by employing two accurately spaced apart marking devices or marking device guides which exactly define the distance which is to occur between the marks that are to be placed upon each plate, the possibility of error in locating the distance between such marks on each plate being eliminated. The prior device was used in connection with marks which were added to the engraving or etching upon the plate and were distinctly apart from the engraving, the marks upon the gauge being permanently fixed.

In accordance with another feature of my invention, the gauge includes substantially coplanar and preferably transparent portions which are located at a distance from each other and are movable transversely of and with respect to the bed to receive imprints from spaced apart portions of a printing plate on the bed to provide indices on the gauge that are located at a distance from each other to register with corresponding printing plate portions upon each plate to be marked. The imprints upon the transparent portions of the gauge are taken from the first of a series of plates in which series all of the plates have similar printing portions so that each plate of the series may be properly positioned with respect to the gauge to enable it to be accurately marked so that it may accurately replace each previously used plate with relation to the marking elements or guides and the gauge.

The invention will be more fully explained in connection with the accompanying drawings in which Fig. 1 is a plan view illustrating the preferred embodiment of the invention showing the gauge out of position; Fig. 2 is a sectional view on line 2—2 of Fig. 1; Fig. 3 is a sectional view on line 3—3 of Fig. 2; Fig. 4 is a plan view showing the gauge in position; and Fig. 5 is a detailed view of a part of the structure, partly in section and partly in elevation.

The apparatus illustrated includes a rectangular bed 1 which constitutes both a support and a positioner for each of the printing plates of a series that is to be correctly marked, one such plate being indicated at 2. The bed is illustrated as being provided with diagonal grooves 3 which receive so-called registering hooks 4 that serve to clamp the plate in relation to the bed. The gauge is inclusive of a frame 5 which is fixed upon a shaft 6 that is journaled at its ends in trunnions 7 and 8 that are respectively carried by brackets 9 and 10, the brackets being themselves carried upon a side of the bed 1. The trunnion 8 is desirably in the form of a screw having a head 11 by which it may be turned into or out of position to enable the frame 5 of the gauge to be removed and replaced.

A sheet of celluloid or other transparent material 12 is secured to the frame 5 to complete the gauge, the gauge having a fixed axis of rotation with respect to the bed when it is mounted as illustrated and described. The gauge may be swung to one side whenever a plate, such as the plate 2, is to be removed or inserted. All parts of the celluloid sheet are coplanar and, particularly, three or more selected parts such as the parts at 12′, 12², and 12³ which are to be moved transversely of and toward the bed 1 to receive impressions from the parts of the plate 2 which underlie these celluloid parts 12′, 12², 12³, Fig. 5. The first plate of the series is positioned with ordinary care with respect to the marking elements which are preferably in the form of parallel drills 13, 14 located abreast and in fixed relation to each other and in fixed relation to the gauge and, particularly the axis of rotation of the gauge, such axis being defined, as stated, by the trunnions 7 and 8. These marking elements 13 and 14 are desirably driven by electric motors 15 and 16, the marking elements and their motors being in fixed relation and each being carried upon an upright rack bar 17 meshing with a pinion 18, each pinion being rotatable by a hand lever 19 upon the stationary bracket 20 whereby the corresponding drill may be raised and lowered.

Each marking element 13 and 14 is provided with a guide 21, said guides being in fixed relation to each other and to the bed and gauge in addition to the fixed relationship of the marking elements to each other and to the bed and gauge. After each plate is provided with the positioning holes 22, 23 by the drills 13 and 14, it is removed and replaced by a succeeding plate having printing portions similar to those that produce the imprints at 12′, 12² and 12³ upon the transparent sheet 12 of the gauge and which printing portions of the plate are placed in register with these imprints.

The bed 1 is shown as being made in two distinct parts which are bolted to the frame 24 of the machine by the bolts 25. The opposing sides of the two parts of the bed 1 are grooved, these grooves and the spaces between the two parts of the bed forming a cross-shaped space 26, as indicated in Fig. 3. The brackets 20 are carried upon upright rods 27 which depend from blocks 28 that fit the space 26, said blocks 28 being slidable in the space 26 to adjust the distance between the parallel axes of the drills 13 and 14. When the drills have been properly positioned with relation to each other and with relation to the bed 1, the mountings therefor are held in fixed relation to the bed 1 by means of the nuts 29 which are screwed upon the bolts 30, said bolts being fixed upon and depending from the blocks 28 while the tops of said nuts are engageable with the under sides of the two sections of the bed 1. The nuts are provided with handles 31 to enable them to be turned.

It will be apparent to those familiar with the art that the holes or other marks 22, 23 upon the various plates of a series may be most accurately positioned by the apparatus of my invention.

When it is stated in the claims that a "fixed" relation exists between certain elements of the implement, it is intended to means that such fixed relation is only necessarily constant during the marking of one set of plates essential to the production of a single design; and such definition of structure is intended to include within its scope implements of this character wherein elements are relatively adjustable so that one fixed relation may be provided therebetween to mark one set of plates and another fixed relation provided, if necessary, to mark another set of plates.

Changes may be made without departing from the invention.

Having thus described my invention, I claim:

1. The herein described method for marking a series of plates from which a single design is to be printed in contrasting colors, which consists in positioning the first plate of the series on a marking implement, imprinting spaced portions of the design from said plate on a gauge of the implement, marking said plate, then successively positioning the other plates of the series on the implement with the imprint on the gauge in registry with the corresponding portions of the design on each plate, and marking each successive plate after such registry is established.

2. A marking implement including a bed for supporting printing plates to be marked, marking means fixed with respect to the bed, a sheet of transparent material having a mounting fixed with respect to the bed, said sheet of material being movable to a predetermined position over the bed to receive imprints from spaced apart portions of a printing plate on said bed to thereby provide a gauge with whose imprints corresponding spaced apart portions of subsequent plates to be marked are adapted to be placed in registry to thereby correctly position said subsequent plates on the bed to be marked by said marking means.

3. A marking implement including a bed for supporting printing plates to be marked, marking means fixed with respect to the bed, a sheet of transparent material having pivotal mounting fixed with respect to the bed whereby said sheet of material is movable to a predetermined position over the bed to receive imprints from spaced apart portions of a printing plate on said bed and with whose imprints corresponding spaced apart portions of subsequent plates to be marked are adapted to be placed in registry to thereby correctly position said subsequent plates on the bed to be marked by said marking means.

In witness whereof, I hereunto subscribe my name.

ROBBINS B. CREHORE.